US012560076B1

(12) United States Patent
Kolbe et al.

(10) Patent No.: US 12,560,076 B1
(45) Date of Patent: Feb. 24, 2026

(54) SYSTEMS AND METHODS TO MONITOR OPERABILTY OF AN ACTUATOR OF A ROTATABLE STEERABLE SYSTEM (RSS)

(71) Applicant: Schlumberger Technology Corporation, Sugar Land, TX (US)

(72) Inventors: Stuart Alan Kolbe, Stonehouse (GB); Denis Li, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/096,912

(22) Filed: Apr. 1, 2025

(51) Int. Cl.
*E21B 7/04* (2006.01)
*E21B 44/00* (2006.01)
*F15B 19/00* (2006.01)

(52) U.S. Cl.
CPC ................ *E21B 44/00* (2013.01); *E21B 7/04* (2013.01); *F15B 19/00* (2013.01)

(58) Field of Classification Search
CPC .................................. E21B 7/04; E21B 44/00
See application file for complete search history.

(56) References Cited

U.S. PATENT DOCUMENTS

2012/0160565 A1* 6/2012 Downton ................ E21B 7/062 175/73
2020/0392790 A1* 12/2020 Perry .................... E21B 10/327
2021/0285296 A1* 9/2021 Feddema .............. E21B 47/024

* cited by examiner

*Primary Examiner* — Tara Schimpf
*Assistant Examiner* — Lamia Quaim

(57) ABSTRACT

A system includes a rotatable steerable system (RSS) of a drilling system. The RSS includes a first steering pad, a first fluid actuator coupled to the first steering pad, a first vent passage coupled to the first fluid actuator, a first valve coupled to the first fluid actuator, and a first pressure sensor coupled to the first fluid actuator. The first pressure sensor is configured to monitor pressure of the first fluid actuator as an indication of a health condition of the RSS.

20 Claims, 7 Drawing Sheets

SYSTEMS AND METHODS TO MONITOR OPERABILTY OF AN ACTUATOR OF A ROTATABLE STEERABLE SYSTEM (RSS)

BACKGROUND

The present disclosure relates generally to a system and method to monitor operability of an actuator of a rotatable steerable system (RSS), such as by monitoring pressure associated with an extension and a retraction of the actuator.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

To meet consumer and industrial demand for natural resources, companies often invest significant amounts of time and money in searching for and extracting oil, natural gas, hydrocarbons, and other subterranean resources from the earth. Particularly, once a desired subterranean resource such as oil or natural gas is discovered, drilling and production systems are often employed to access and extract the resource. These systems may be located onshore or offshore depending on the location of a desired resource. Common methods include deploying the drilling and production systems on the surface or on a floating platform disposed above the discovered resources, and drilling a borehole straight down into the surface of the earth to procure the desired resource(s).

However, in some scenarios, the RSS of a drilling system may experience issues causing inefficiencies in drilling operations. Accordingly, a need exists to collect real-time data to inform the user of the efficiency and operability of the RSS during drilling operations to improve real-time control of the RSS.

SUMMARY

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In certain embodiments, a system includes a rotatable steerable system (RSS) of a drilling system. The RSS includes a first steering pad, a first fluid actuator coupled to the first steering pad, a first vent passage coupled to the first fluid actuator, a first valve coupled to the first fluid actuator, and a first pressure sensor coupled to the first fluid actuator. The first pressure sensor is configured to monitor pressure of the first fluid actuator as an indication of a health condition of the RSS.

In certain embodiments, a method includes operating a rotatable steerable system (RSS) of a drilling system. The RSS includes a first steering pad, a first fluid actuator coupled to the first steering pad, a first vent passage coupled to the first fluid actuator, a first valve coupled to the first fluid actuator, and a first pressure sensor coupled to the first fluid actuator. The method further includes monitoring, via the first pressure sensor, a pressure of the first fluid actuator as an indication of a health condition of the RSS.

In certain embodiments, a system includes a controller having a processor, a memory, and instructions stored on the memory and executable by the processor to operate a rotatable steerable system (RSS) of a drilling system. The RSS includes a first steering pad, a first fluid actuator coupled to the first steering pad, a first vent passage coupled to the first fluid actuator, a first valve coupled to the first fluid actuator, and a first pressure sensor coupled to the first fluid actuator. The controller is further configured to monitor, via the first pressure sensor, a pressure of the first fluid actuator as an indication of a health condition of the RSS.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
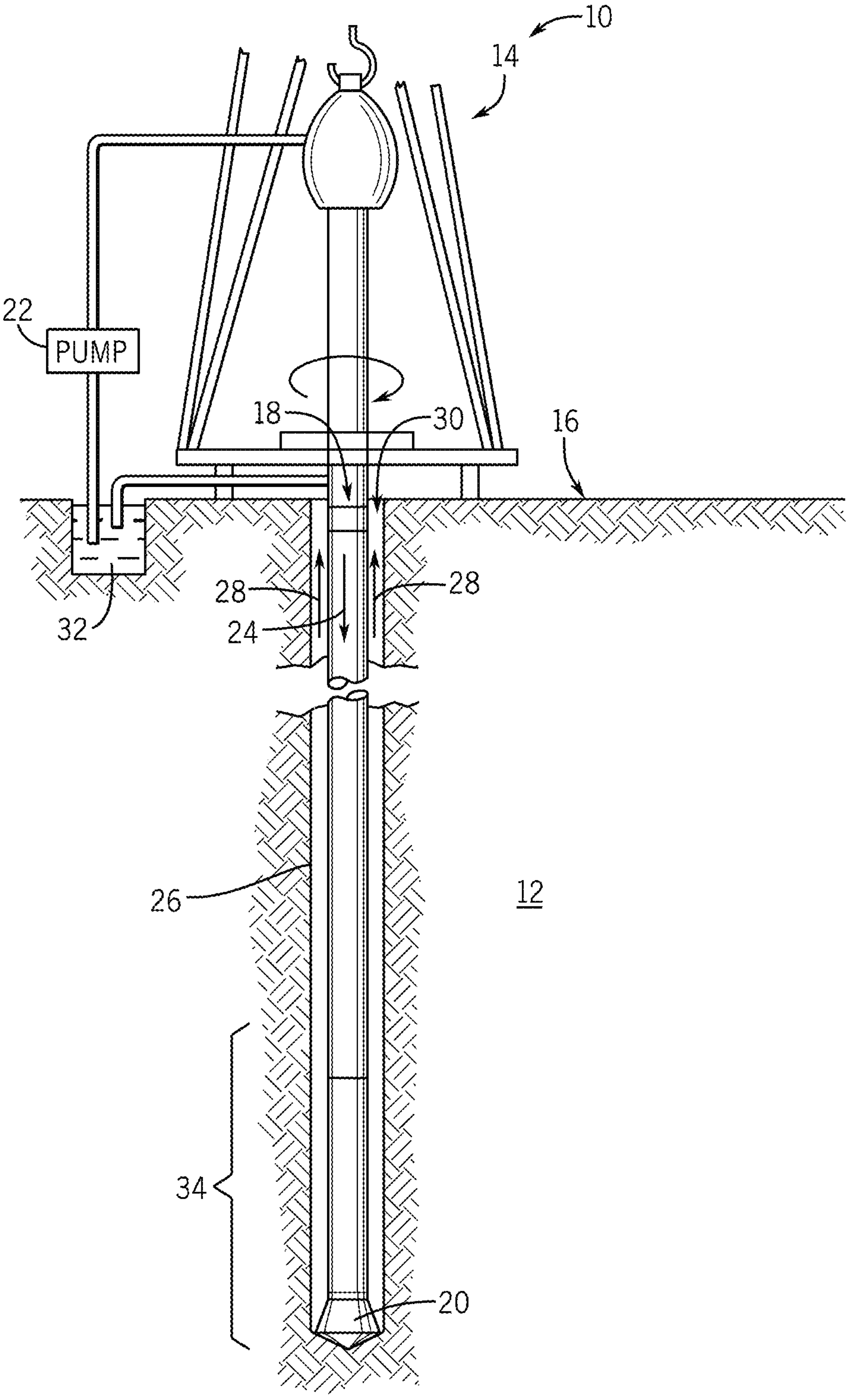
FIG. 1 is a schematic view of an embodiment of a drilling system including a downhole tool string having a bottom hole assembly (BHA)

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection (e.g., where the connection may not include or include intermediate or intervening components between those coupled), and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment," "an embodiment," or "some embodiments" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Certain terms are used throughout the description and claims to refer to particular features or components. As one skilled in the art will appreciate, different persons may refer to the same feature or component by different names. This document is not intending to distinguish between components or features that differ in name, but not function.

For decades, humans have relied on resources found below the earth's surface to meet increasing energy demands. These resources include but are not limited to natural gas, coal, hydrocarbons, petroleum, and other materials suitable to generate energy for consumption by humans. As energy demands increase, significant efforts are expended to extract an appropriate supply of energy to meet the increasing demand. Included in these efforts are systems and methods that enable expanded extraction of the resources, increases to the efficiency of the extraction process, and technological advances that permit extraction and exploration in areas that were previously inaccessible for energy production. Recently, one area of exploration that has grown with the advance of energy exploration related technology is the extraction of resources from a portion of the earth's surface where it is not feasible to dispose drilling and production facilities directly above the subterranean resources.

As one might expect, extracting resources from an area below the earth's surface without being able to drill straight down introduces additional challenges that might not necessarily be present when extracting resources from the earth in a conventional manner. For example, operators calculate a location for the drilling and production facilities sufficiently laterally spaced from the resources, and determine an arc profile path that they may then maneuver the drill bit and accompanying drill string along the determined path to approach the desired resources from the side, rather than from above. While traditional resource procurement systems may not require equipment configured to direct the drill bit along an arc-shaped path or obtain optimal control over the lateral drilling, directional drilling systems utilize an array of drill bits, valves, actuators, motors, seals, sensors, control systems, and other components that work together to enable the operator to direct the drilling components along the determined path though the subterranean formations. Systems and methods for directional drilling and the arc profile paths taken during operation are constrained by the operability of the fluid actuators (e.g., piston-cylinder assemblies) used in the rotary steerable system (RSS). For example, if the piston-cylinder assemblies do not properly extend or retract during each cycle of operation, then the directional drilling may not achieve the desired arc profile path. Unfortunately, without any feedback on the operability of the RSS, particularly the piston-cylinder assemblies, the drilling system may miss a target geological formation having resources (e.g., oil and gas). Accordingly, as discussed in detail below, the disclosed embodiments control operation of the RSS using real-time sensor feedback (e.g., pressure feedback) from sensors (e.g., pressure sensors) coupled to the piston-cylinder assemblies to improve the directional drilling, initiate maintenance operations, and/or adjust other aspects of the drilling operation. For example, if a health condition (e.g., a control condition, a failure condition, a leak condition, a plugged condition and/or a stuck condition) is detected by the sensor feedback, then a control system may initiate one or more corrective control actions in real-time to help reduce or eliminate the health condition. For example, the corrective control actions may include stopping drilling and cleaning drilling equipment, rotating the drill string at a high rotational speed for a duration of time, changing fluid flow (e.g., increased flow rate, pulsing flow, changing to a flushing fluid, etc.) through the RSS tool to help clean out any plugging, performing a corrective steering control to compensate for the plugged condition and/or the stuck condition, inducing imbalance or vibration to downhole tools to clear debris, or any combination thereof.

Turning to the drawings, FIG. 1 illustrates a drilling system 10 (e.g., subterranean drilling system) that may be used to drill a well through subterranean formations 12 to extract various fluids (e.g., oil, natural gas, or hydrocarbon containing fluids). As discussed in further detail below, sensor feedback (e.g., pressure feedback) is used to monitor and control a rotary steerable system tool in real-time, thereby improving directional drilling operations of the drilling system 10. In the illustrated embodiment, a drilling rig 14 at the surface 16 may rotate a drill string 18, which includes a drill bit 20 at its lower end to engage the subterranean formations 12. The drilling system 10 is configured to rotate the drill bit 20 to cut a vertical borehole 26 in the subterranean formations 12, and in certain embodiments, the drilling system 10 is configured to rotate the drill bit to cut a curved, vertical, or tangent borehole in the subterranean formations 12. To cool and/or lubricate the drill bit 20, a drilling fluid pump 22 may pump drilling fluid 28, commonly referred to as "mud" or "drilling mud," from a mud pit 32, downward through the center of the drill string 18 in the direction of the arrow 24 to the drill bit 20. In addition to cooling and lubricating, as discussed in further detail below, the drilling fluid 28 may also facilitate the drill bit 20 turning and cutting the curved borehole. At the drill bit 20, the drilling fluid 28 may then exit the drill string 18 through ports and flow into the borehole 26. While drilling, the drilling fluid 28 may be pushed toward the surface 16 through an annulus 30 between the drill string 18 and the formation 12, thereby carrying drill cuttings away from the bottom of the borehole 26. Once at the surface 16, the returned drilling fluid 28 may be filtered and conveyed back to the mud pit 32 for reuse. Additionally, the drilling fluid 28 may exert a mud pressure on the formation 12 to reduce likelihood of fluid from the formation 12 leaking into the borehole 26 and/or out to the surface 16. Further, a bottom hole assembly (BHA) 34 includes various components (e.g., drill bit 20, rotary steerable system having a controller using pressure feedback, etc.) that operate together as part of the drilling system 10, as discussed in further detail below.

As discussed above, the drilling system 10 may be configured to rotate the drill bit 20 to cut a curved, or an arc shaped path to reach subterranean resources that are not located directly below the drilling and production facilities.

Figure 2:
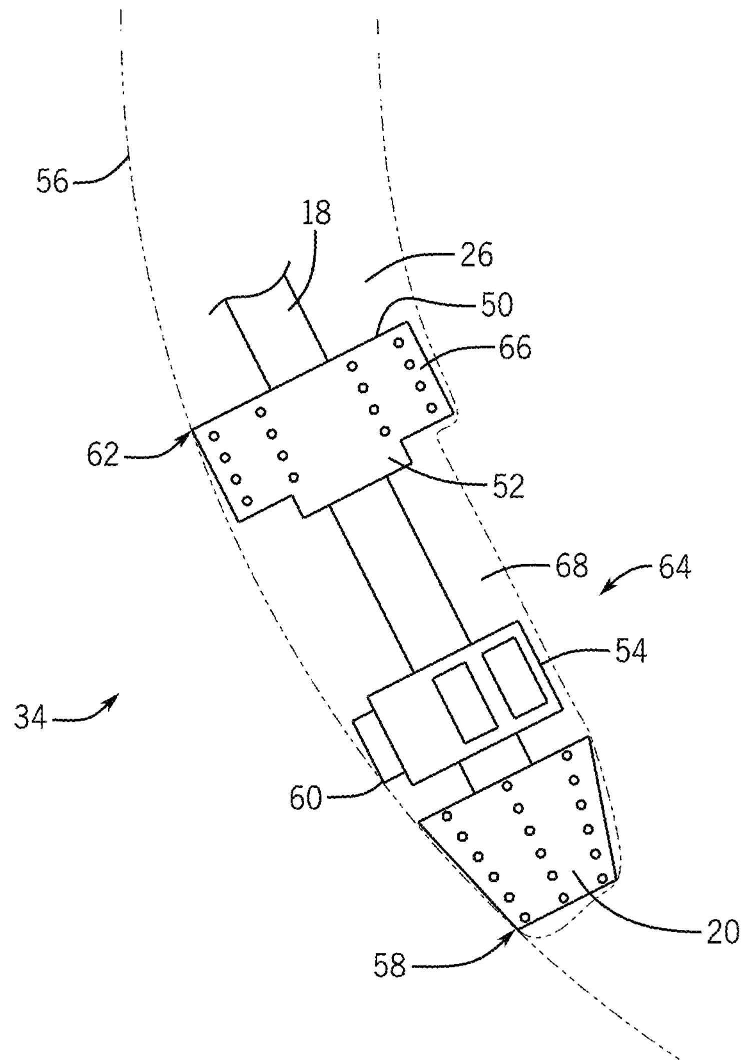
FIG. 2 is a schematic view of an embodiment of the BHA of FIG. 1, illustrating a rotary steerable system (RSS) tool and a drill bit operating to drill a curved borehole.

FIG. 2 illustrates an embodiment of the BHA 34 having a reamer 50, a rotary steerable system (RSS) tool 64 having a steering pad assembly 54, and the drill bit 20, wherein the drill bit 20, the steering pad assembly 54, and the reamer 50 provide points of contact 58, 60, 62 for defining an arc shaped profile 56 for drilling. In certain embodiments, the RSS tool 64 (e.g., steering pad assembly 54) includes one or more sensors (e.g., pressure sensors) configured to monitor operation of the steering pad assembly 54, thereby enabling real-time monitoring and control of the RSS tool 64 in response to any sensed operability issues. In certain embodiments, the BHA 34 may include additional components as discussed in further detail below. The reamer 50 may have a larger cutting diameter than the drill bit 20. Additionally, or alternatively, the BHA 34 is configured to cut a pilot hole 68 for the borehole 26 by utilizing the drill bit 20 to engage with and drill through the subterranean formation 12. In cutting the pilot hole 68 for the borehole 26, the BHA 34 enables the reamer 50 to follow behind the drill bit 20 and open the pilot hole 68 into a larger diameter borehole 26. In the illustrated embodiment, the drill bit 20, the steering pad assembly 54, and the reamer 50 each provide a point of contact with either the pilot hole 68 or the borehole 26. It should be noted, however, that the BHA 34 may be used without a reamer 50.

As shown, the drill bit 20 provides a first contact point 58 with the drilled pilot hole 68, the steering pad assembly 54 provides a second contact point 60 with the drilled pilot hole 68, and the reamer 50 provides a third contact point 62 with the borehole 26. Taken together, the points of contact, 58, 60, 62 define the arc shaped profile 56 of the pilot hole 68 and borehole 26 cut by the drill bit 20 and reamer 50 respectively. As discussed above, the drill bit 20 engages with the subterranean formation 12 to cut the pilot hole 68 and provides the first contact point 58 of the curved profile path. Additionally, the RSS tool 64 is configured to rotate with the drill string 18 and the drill bit 20, and as the RSS tool 64 rotates, the tool is configured to actuate the steering pad assembly 54 to steer and direct the drill bit 20. The steering pad assembly 54 is configured to radially extend and radially retract individual steering pads of the steering pad assembly 54 as it rotates as part of the RSS tool 64, and as an individual steering pad is radially extended, it contacts a wall of the pilot hole 68 cut by the drill bit 20. This contact between the individual steering pad and the pilot hole 68 acts as the second contact point 60 defining the arc shaped profile 56. Additionally, the reamer 50 is configured to follow the path cut by the drill bit 20 and cut the borehole 26 to a larger diameter suitable for producing resources. The reamer 50 engages with the subterranean formation 12 and cuts the production hole and provides the third contact point 62, that in conjunction with the first contact point 58 and the second contact point 60, defines the geometry and path of the arc shaped borehole profile.

The reamer 50 is coupled to the RSS tool 64 and the drill string 18, wherein the reamer 50 is a cutting structure configured to open or drill the pilot hole 68 into the borehole 26 that is a bit gauge diameter or larger. The reamer 50 may be rotationally coupled or fixed to the drill string 18 and/or the RSS tool 64. Thus, the reamer 50 may be configured to rotate directly with rotation of the drill string 18, and/or the RSS tool 64 may be configured to rotate directly with rotation of the drill string 18. The reamer 50 may include a stabilizer portion 52 and a cutter portion 66. In the illustrated embodiment, the stabilizer portion 52 of the reamer is configured to prevent deviation from the directed path and maintain the trajectory of the reamer 50, so that it may follow the path of the pilot hole 68. The cutter portion 66 of the reamer 50 includes an outer circumferential surface that includes multiple blades or cutting elements configured to drill the subterranean formation 12. In certain embodiments, the cutter portion 66 of the reamer 50 may include multiple outer circumferential surfaces, each with different diameters. In other embodiments, the cutter portion 66 of the reamer 50 has an outer circumferential surface with a substantially constant diameter.

Figure 3:
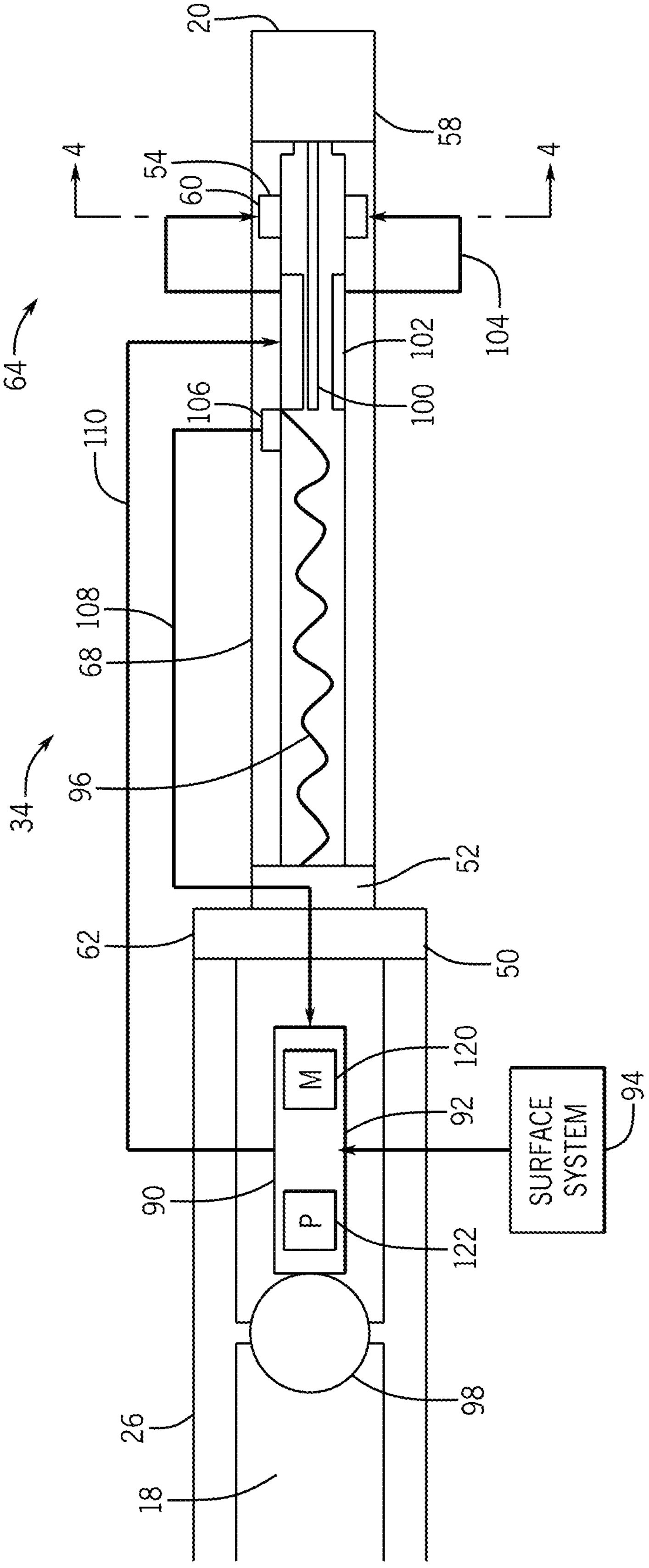
FIG. 3 is a schematic view of an embodiment of the BHA of FIGS. 1 and 2, further illustrating aspects of the RSS tool incorporating sensor feedback (e.g., pressure feedback) associated with operation of the RSS tool.

FIG. 3 illustrates a schematic view of an embodiment of the BHA 34 and its associated components, further illustrating the three points of contact 58, 60, and 62 provided by the drill bit 20, the steering pad assembly 54, and the reamer 50 for defining the arc shaped profile 56 for maneuverable directional drilling. In certain embodiments, the RSS tool 64 (e.g., steering pad assembly 54) includes one or more sensors (e.g., pressure sensors) configured to monitor operation of the steering pad assembly 54, thereby enabling real-time monitoring and control of the RSS tool 64 in response to any sensed operability issues. As discussed above, the RSS tool 64 includes the drill bit 20 that cuts a curved pilot hole 68 along a curved path. In the illustrated embodiment, the RSS tool 64 is coupled to a reamer 50, which in turn is coupled to the drill string 18.

In the illustrated embodiment, the drill string 18 includes a steering control unit 90, which further includes a steering controller 92. The steering control unit 90 is configured to fluidly connect the drilling fluid 28 with mud control valves 102 in the RSS tool 64 to facilitate steering operations performed by the RSS tool 64. The steering controller 92 includes a processor 122, a memory 120, and instructions stored on the memory 120 and executable by the processor 122 to control various components of the RSS tool 64. In the illustrated embodiment, the steering controller 92 communicatively couples to a forward sensor package 106, the mud control valves 102, and to a surface system 94. Furthermore, in a non-limiting embodiment, the steering controller 92 outputs data/control signal(s) 110 to the mud control valves 102, receives input data/input signal(s) from the surface system 94 and receives sensor data 108 from the forward sensor package 106. The steering controller 92 may be configured to receive an input from an operator in the drilling and production facilities on the surface 16, via the surface system 94, and then output instructions (e.g., data/control signal(s) 110), via the processor 122 and memory 120, to the mud control valves 102 to facilitate steering of the RSS tool 64.

In the illustrated embodiment, the RSS tool 64 includes the steering pad assembly 54. The mud control valves 102 are fluidly coupled to the steering pad assembly 54 by pressurized mud lines 104 (e.g., fluid conduits) that are configured to provide pressurized drilling fluid 28 to the steering pad assembly 54. As discussed in further detail below, the steering pad assembly 54 rotates with the drill bit 20 and is configured to actuate at least one steering pad from the steering pad assembly 54, such that the steering pad may radially extend and radially retract during operation. The mud control valves 102 are configured to provide the drilling fluid 28 to the steering pad assembly 54 via the pressurized mud lines 104, and in certain embodiments, each valve as part of the mud control valves 102 is fluidly connected to a respective steering pad of the steering pad assembly 54 via an individual pressurized mud line 104. In some embodiments, the steering controller 92 outputs instructions to the mud control valves 102 to automatically distribute pressurized drilling fluid 28 through the pressurized mud lines 104. In certain embodiments, the steering controller 92 is configured to control the mud control valves 102 to selectively provide mud to one or more steering pads of the steering pad assembly 54, thereby controlling which steering pad is actuated and a degree of actuation (e.g., radial extension or retraction) of the particular steering pad of the steering pad assembly 54. In this manner, the steering controller 92 is configured to control the second contact point 60 provided by the steering pad assembly 54, such that the steering controller 92 controls the second contact point 60 in combination with the first contact point 58 provided by the drill bit 20 and the third contact point 62 provided by the reamer 50 to define the arc shaped profile 56 for maneuverable directional drilling.

During steering and drilling operations, the steering control unit 90 is configured to receive sensor data 108 from the forward sensor package 106. In certain embodiments, the forward sensor package 106 includes multiple sensors configured to monitor operating parameters of the drilling fluid 28 in the RSS tool 64 (e.g., drilling fluid pressure, drilling fluid flow rate, fluid pressure in fluid actuators (e.g., piston-cylinder assemblies) of the steering pad assembly 54, etc.) during the drilling operation. For example, the steering control unit 90 may monitor real-time pressure feedback from the piston-cylinder assemblies of the steering pad assembly 54, evaluate a health condition of the RSS tool 64, initiate corrective actions to improve the health condition, and/or control operation of the RSS tool 64 based on the health condition. The steering control unit 90 and the steering controller 92 may receive these operational parameters and output these parameters to the surface 16 via the surface system 94. In certain embodiments, the steering control unit 90 may be configured to automatically adjust the various operating parameters during the drilling operation in order to facilitate the drilling operations.

In certain embodiments, the RSS tool 64 may include or exclude a mud motor 96 and a transmission 100. In the illustrated embodiment, the RSS tool 64 includes the mud motor 96 and the transmission 100. The mud motor 96 may be an electric motor, a fluid-driven motor (e.g., driven by fluid flow of mud), or a combination thereof. In certain embodiments, the mud motor 96 is a fluid-driven motor having a spiral or helical flow path along a shaft (e.g., a helical or spiral shaft). The mud motor 96 is configured to provide rotational energy to the drill bit 20 during drilling operations, such that the mud motor 96 can adjust (e.g., increase or decrease) drilling speeds, and also helps to balance the weight transmitted by the reamer 50 to the drill bit 20. In this way, the mud motor 96 enables the drill bit 20 and RSS tool 64 to prevent overloading of the drill bit in situations where the drill bit 20 diameter is significantly smaller than the reamer 50.

Additionally, or alternatively, the mud motor 96 may couple to the transmission 100, which is configured to receive a rotational energy (e.g., rotational speed RPM and torque, etc.) from the mud motor 96, and output a modified rotational energy to the drill bit 20. For example, if during a portion of the drilling operation a higher relative torque and lower relative rotational speed at the drill bit 20 is advantageous to better cut through the subterranean formation 12, the transmission 100 is configured to receive the rotational energy output from the mud motor 96, and adjust the rotational energy output such that the torque is increased, thereby decreasing the rotational speed at the drill bit 20. Additionally or alternatively, during an additional portion of the drilling operation a relatively higher rotational speed and lower relative torque at the drill bit 20 is advantageous to better cut through the subterranean formation 12, the transmission 100 is configured to receive the rotational energy output from the mud motor 96, and adjust the rotational energy output such that the rotational speed is increased, thereby decreasing the torque at the drill bit 20. The transmission 100 may include a plurality of gears and shafts of varying diameters and configurations, such that when these aforementioned adjustments are desired, the transmission 100 is configured to adjust a configuration of the gears and shafts to manipulate the output rotational energy from the mud motor 96 into an appropriate rotational energy profile at the drill bit 20. In certain embodiments, the mud motor 96 and the transmission 100 are controlled by the surface system 94, such that the user in the drilling and production facilities may output instructions to the mud motor 96 and transmission 100. In other embodiments, the mud motor 96 and transmission may be automatically controlled by the steering controller 92, and the parameters and configurations of the mud motor 96 and the transmission 100 may be dynamically adjusted in response to information from the sensor data 108. However, in certain embodiments, the mud motor 96 and the transmission 100 may be excluded to reduce a length of the BHA 34, thereby helping to improve maneuverability via the RSS tool 64.

In the illustrated embodiment, the reamer 50 includes a pivot joint 98 (e.g., rotational axis crosswise to a longitudinal axis of the drill string 18). The pivot joint 98 is disposed within the reamer 50, axially upstream or above the reamer 50, and/or axially upstream or above the RSS tool 64. During drilling operations, due to the nature of the RSS tool 64 and the reamer 50 cutting a curved borehole, a bending moment may be generated in a portion of the drill string 18 located above the reamer 50. In certain embodiments, the pivot joint 98 may be configured to alleviate such bending moments, and enable the RSS tool 64 and reamer 50 to cut a curved borehole with a tighter radius than otherwise possible. The pivot joint 98 may be configured to mechanically couple the drill string 18 to the reamer 50, while simultaneously enabling the reamer 50 and the RSS tool 64 to pivot in relation to the remainder of the drill string 18. The placement of the pivot joint in relation to the points of contact 58, 60, 62 between the RSS tool 64 and reamer 50 and the pilot hole 68 and borehole 26 respectively determine an effectiveness of the pivot joint in alleviating such bending moments.

As discussed previously, the drill bit 20, the steering pad assembly 54 and the reamer 50 provide the first, second, and third points of contact 58, 60, 62 along the pilot hole and borehole necessary to define the arc of the curved path cut during the directional drilling operations. As a result, the associated lengths between the drill bit 20, the steering pad assembly 54, and the reamer 50 and the corresponding points of contact determine a radius of curvature of the pilot hole 68 drilled by the drill bit 20, and the associated radius of curvature of the borehole 26 cut by the reamer 50 as it follows the drill bit 20.

Figure 4:
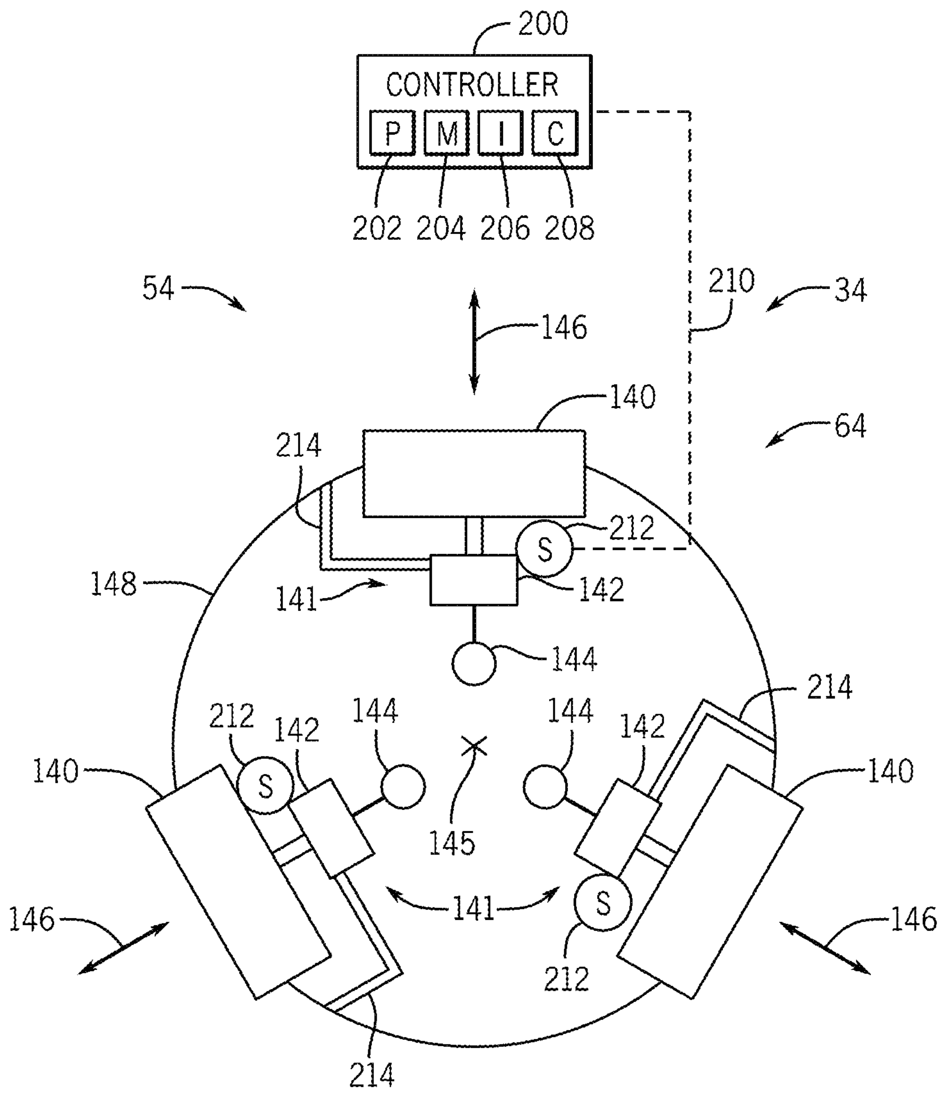
FIG. 4 is a section view of an embodiment of the RSS of FIG. 3 taken through line 4-4, further illustrating aspects of a steering pad assembly having fluid actuators (e.g., piston-cylinder assemblies) with sensors (e.g., pressure sensors) to provide the sensor feedback.

FIG. 4 illustrates a schematic cross-sectional view of an embodiment of the steering pad assembly 54 of the RSS tool 64, further illustrating aspects of the steering pad assembly 54 and sensor feedback used to monitor and control operation of the RSS tool 64. As illustrated, the steering pad assembly 54 includes a plurality of steering pads 140, with each steering pad 140 coupled to a steering pad drive or actuator 141 configured to radially adjust (e.g., radially extend or radially retract) the steering pad 140 in response to control by the steering controller 92. In particular, the steering controller 92 may be configured to control the steering pad drive or actuator 141 for each steering pad 140 independently, such that the desired steering pad 140 can be actuated to adjust the second contact point 60. The steering pad drive or actuator 141 may include an electric drive or actuator (e.g., electric or digital actuator), a fluid drive or actuator (e.g., driven by mud, hydraulic fluid, or other fluid), or any combination thereof. In the illustrated embodiment, the steering pad drive or actuator 141 includes a fluid drive or actuator having a respective steering pad piston-cylinder assembly 142 (e.g., piston that reciprocates with a cylinder) and a steering pad valve 144. In the illustrated embodiment, the steering pad assembly 54 includes three (3) steering pads 140. However, a steering pad assembly 54 with fewer or more (e.g., 2, 4, 5, 6, 7, 8, etc.) steering pads 140 is considered within the scope of the various embodiments of the present disclosure. As discussed in further detail below, each steering pad 140 is configured to actuate along a direction of movement 146 (e.g., radial path of travel oriented in a radial direction relative to a central axis 145 of the BHA 34) that corresponds to the individual steering pad 140. In the illustrated embodiment, the direction of movement 146 of each steering pad 140 is normal to an outer surface 148 of the RSS tool 64. Additionally, or alternatively, the steering pad 140 is configured to actuate along a path substantially aligned with the indicated direction of movement 146. At one end of the path, the steering pad 140 may protrude outside of the outer surface 148 (e.g., annular exterior surface or wall) of the RSS tool 64. At an opposite end of the path, the steering pad 140 may retract within the outer surface 148 of the RSS tool 64.

The steering pad piston-cylinder assembly 142 and the steering pad valve 144 function together to control the actuation of the steering pad 140 along the path and the illustrated direction of movement 146. In a non-limiting embodiment, the steering pad valve 144 is fluidly coupled to a mud control valve via a pressurized mud line. The steering pad valve 144 is configured to receive drilling fluid 28 from the mud control valve and the pressurized mud line, and thereby output the received drilling fluid 28 to the steering pad piston in order to actuate the steering pad 140 along the movement path from a radially retracted position to a radially protruded position. In certain embodiments, the steering pad valve 144 is configured to direct drilling fluid 28 to a first side of a piston of the steering pad piston-cylinder assembly 142 to actuate the piston to push the steering pad 140 into a radially protruded position. Additionally, the steering pad valve 144 is configured to direct drilling fluid 28 to a second side of the piston of the steering pad piston-cylinder assembly 142 to actuate the piston to pull the steering pad 140 into a radially retracted position. In other embodiments, the steering pad valve is configured to receive pressurized oil, and thereby output the received pressurized oil to the steering pad piston in order to actuate the steering pad 140 along the movement path from a radially retracted position to a radially protruded position. The steering pad piston may be a variety of shapes and configurations. Specifically, the steering pad piston may be a cylindrical piston, a ball-shaped piston, a rubber-bonded piston, or the like. Further, the steering pad piston may be one piece, or may be a separate pad and a separate piston, may be a piston and pad coupled together, or the like.

In a non-limiting embodiment, as the steering pad assembly 54 rotates with the drill bit 20 and the RSS tool 64, the steering pad assembly 54 is configured to actuate the steering pad valve 144 and steering pad piston-cylinder assembly 142 to drive the movement of the steering pad 140. For example, the steering pad assembly 54 actuates an individual steering pad 140 to push against the wall of the pilot hole 68 cut by the drill bit 20, thereby causing the drill bit 20 to cut the pilot hole 68 with a determined radius of curvature. As a result, the steering pad assembly 54 actuates the steering pad 140 to protrude and provide the second contact point 60 between the pilot hole 68 and the RSS tool 64. In a non-limiting embodiment, the steering pad assembly 54 may actuate the steering pad 140 to radially protrude at a point of the rotation, such that the steering pad 140 radially extends at a position opposite of the cutting path of the drill bit 20. In some embodiments, the steering pad assembly 54 may be rotationally decoupled from the drill bit 20 and the RSS tool 64, and the steering pad assembly 54 may be mounted on a rotationally fixed sleeve. In some embodiments, the steering pad assembly 54 may be mounted on a sleeve that is configured to rotate independently from the drill bit 20 and the RSS tool 64.

The steering pad piston-cylinder assembly 142 may be attached to a vent passage 214. In operation, the RSS tool 64 performs a cycle of each steering pad 140 of the steering pad assembly 54 by opening the steering pad valve 144 to enable actuation of the steering pad piston-cylinder assembly 142 and radial movement of the steering pad 140 from a retracted position to an extended position, followed by closing the steering pad valve 144 to enable deactivation of the steering pad piston-cylinder assembly 142 and radial movement of the steering pad 140 from the extended position to the retracted position. In particular, the opening of the steering pad valve 144 enables a flow of the drilling fluid 28 to the steering pad piston-cylinder assembly 142 to drive a piston within a cylinder of the steering pad piston-cylinder assembly 142, thereby driving the piston and the steering pad 140 from the retracted position to the extended position to push the respective steering pad 140 against the wall of the pilot hole 68. In certain embodiments, the vent passage 214 may remain open during the actuation and deactivation of the steering pad piston-cylinder assembly 142. However, once the steering pad valve 144 closes during deactivation, the vent passage 214 enables the drilling fluid 28 to vent from the steering pad piston-cylinder assembly 142, thereby enabling retraction of both the piston and the steering pad 140. If the vent passage 214 becomes partially or completed plugged (e.g., a plugged condition), then the plugged condition can impede the proper retraction of the piston and the steering pad 140. Similarly, if the piston and/or steering pad 140 are partially stuck (e.g., stuck condition), then the vent passage 214 may vent the steering pad piston-cylinder assembly 142 while the piston and/or steering pad 140 are not properly moving from the extended position to the retracted position. Further, if the system achieves peak pressure when the piston is not pointing toward direction 146, it may indicate the controller 200 is incorrectly defining the moment to actuate the piston and/or steering pad 140 (e.g., control condition) or the system has a large hydraulic lag that may be indicative of failure of internal mechanical components (e.g., failure condition). When the system has a leak (e.g., leak condition), the one or more sensors 212 may determine the system has a low pressure. These operability issues (e.g., control condition, failure condition, leak condition, plugged condition, and/or stuck condition) can be monitored by sensor feedback from one or more sensors 212 coupled to the steering pad piston-cylinder assembly 142.

In the illustrated embodiment, the steering pad piston-cylinder assembly 142 may be connected to one or more sensors 212. The sensors 212 may include a pressure sensor and an actuation meter. The sensors 212 may be in the pressure chamber (e.g., chamber of the cylinder adjacent the piston) or connected to the pressure chamber, such that the sensors 212 can detect relevant activities in the pressure chamber. The pressure sensor may measure the pressure in the pressure chamber of the steering pad piston-cylinder assembly 142 over time for each cycle of each steering pad 140 of the steering pad assembly 54. The pressure in the pressure chamber may change constantly over time, as the pistons in the steering pad piston-cylinder assembly 142 actuate at a high rate of speed, and the pressure in the pressure chamber changes with every movement from the piston.

The actuation meter may measure a movement per time and/or a number of actuations (e.g., cycles) of each steering pad 140 and each piston in the steering pad piston-cylinder assembly 142 over time. For example, the actuation meter may include a position sensor configured to monitor movement of the piston in a radial direction between a retracted position and an extended position for each cycle of operation. The actuation meter (e.g., position sensor) may include an optical proximity sensor, an inductive sensor, a photodiode array, a Hall effect sensor, or any combination thereof. A higher or lower actuation rate may indicate a problem with the piston and may cause drilling errors by improperly steering the drill bit through the ground. Additionally, a lack of proper movement of the piston and/or an incorrect rate of movement of the piston may indicate a problem with the vent passage 214 (e.g., plugged condition) and/or a problem with the piston or the steering pad 140 (e.g., stuck condition). In certain embodiments, the actuation meter may be used to monitor a time duration, an axial movement of the piston, or a combination thereof, for each cycle in combination with pressure measurements by the pressure sensor. For example, the piston movement and the pressure profile for each cycle may be analyzed together to identify any issues with plugging of the vent passage 214, sticking of the piston, sticking of the steering pad 140, or any combination thereof.

The controller 200 is configured to control operation of the RSS tool 64, including all or part of the normal operational mode. The controller 200 includes one or more processors 202, memory 204, instructions 206, and communication circuitry 208. The communication circuitry 208 is configured to enable wired or wireless communication between the controller 200 one or more computing devices, such as a local computing device and a remote computing device. For example, the communication circuitry may include WiFi circuitry (e.g., IEEE 802 protocol), Bluetooth circuitry (e.g., Bluetooth Low Energy (BLE)), wireless broadband circuitry (e.g., long-term evolution (LTE)), long-term evolution machine type communication (LTE-M) circuitry, low-rank adaptation (LoRA) circuitry, or any combination thereof. The processor(s) 202 may be any suitable type of computer processor or microprocessor capable of executing computer-executable code. Moreover, the processor(s) 202 may include multiple microprocessors, one or more "general-purpose" microprocessors, one or more special-purpose microprocessors, and/or one or more application specific integrated circuits (ASICS), or some combination thereof. For example, the processor(s) 202 may include one or more than one reduced instruction set (RISC) or complex instruction set (CISC) processors. The memory 204 may also be used to store instructions 206 executed by the processor(s) 202, sensor data acquired by the sensors 212, and other software applications. The memory 204 may represent non-transitory computer-readable media (e.g., any suitable form of memory 204 or storage) that may store the processor-executable code used by the processor(s) 202 to perform various techniques described herein. As illustrated, the RSS tool 64 includes one or more controllers 200 that communicate with and/or control data acquisition from the sensors 212. The controllers 200 may connect with the sensors 212 via a connection 210, which may be a wireless or wired connection.

In certain embodiments, the controller 200 monitors sensor feedback from the sensors 212 (e.g., fluid pressure and piston position) and controls operation of the RSS tool 64 to account for the sensor feedback. For example, if the sensor feedback from the sensors 212 indicates irregular measurements (e.g., irregular pressure and/or piston position measurements) during a cycle of the piston coupled to a respective steering pad 140, then the controller 200 may perform an analysis of the irregular pressure measurements and initiate one or more control actions. By further example, an irregular pressure may be an unusually high pressure or rate of pressure increase during piston retraction caused by plugging of the vent passage 214, an unusually low pressure or rate of pressure decrease during piston retraction caused by sticking of the piston and/or the steering pad, or a combination thereof. By further example, an irregular piston position may be an unusually slow movement of the piston, an erratic movement of the piston, one or stuck positions of the piston for periods of time, or a combination thereof. The analysis may include a health analysis to quantify a health condition of the RSS tool 64, such as by assigning a correlation coefficient to each set of a piston and a steering pad 140 and/or an average correlation coefficient of all sets of pistons and steering pads 140 for the RSS tool 64. As discussed in further detail below with reference to FIGS. 6-11, the correlation coefficient may vary depending on a severity of a control condition, a failure condition, a leak condition, a plugged condition of the vent passage 214, and/or a stuck condition of the piston and steering pad 140. Additionally, the analysis may include a root cause analysis to identify a cause of the irregular measurements, such as the control condition, the failure condition, the leak condition, the plugged condition, and/or the stuck condition. If the analysis by the controller 200 indicates that the correlation coefficient is outside of an acceptable range (e.g., upper and lower threshold values), then the controller 200 may initiate one or more corrective control actions to help remove the plugged condition and/or the stuck condition.

The corrective control actions may include a stop of drilling by the drilling system, a cleaning operation to clean the RSS tool 64, a corrective steering control to compensate for the health condition (e.g., control condition, failure condition, leak condition, plugged condition, and/or stuck condition), or a combination thereof. For example, the cleaning operation may be performed while continuing drilling and/or after stopping the drilling operation. The cleaning operation may include a change in a rotational speed of the drill string (e.g., an increase in the rotational speed for a duration of time), and/or a change in a fluid flow through the RSS tool 64 (e.g., increased flow rate, pulsing flow, and/or a changing to a flushing fluid, etc.), or any combination thereof, to help eliminate the health condition (e.g., control condition, failure condition, leak condition, plugged condition and/or stuck condition). For example, the cleaning operations may increase the rotational speed by least equal to or greater than 1.5, 2, 2.5, or 3 times the normal rotational speed for a period of time of at least 1, 5, or 10 minutes. By further example, the cleaning operation may include an increase in flow rate of at least equal to or greater than 1.5, 2, 2.5, or 3 times the normal flow rate through the RSS tool 64, pulsing the flow rate through the RSS tool 64, changing the fluid to a different fluid with chemicals and/or flushing agents, or any combination thereof, for a period of time of at least 1, 5, or 10 minutes. In certain embodiments, the corrective steering control may compensate for any health conditions in one or more of the piston-cylinder assemblies, such as by increasing an operating pressure of the drilling mud, changing the actuation times, and/or relying on less than all of the piston-cylinder assemblies for the directional drilling, if acceptable steering can be achieved.

Figure 5:
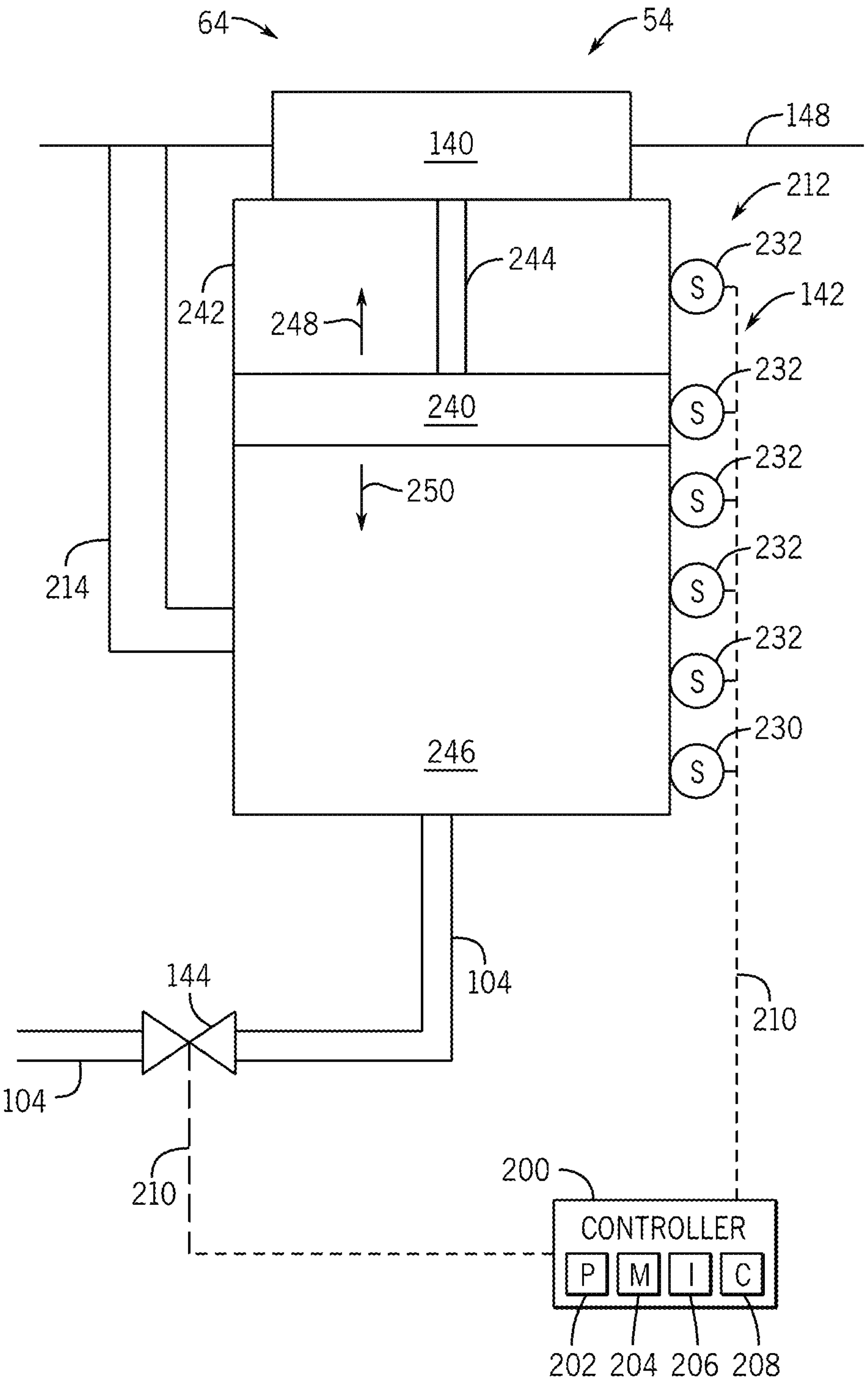
FIG. 5 is a block diagram of an embodiment of the RSS of FIGS. 2-4, further illustrating the sensors (e.g., pressure sensors) coupled to the fluid actuator (e.g., piston-cylinder assembly) of the steering pad assembly.

FIG. 5 is a block diagram of the RSS tool 64 of FIGS. 2-4, further illustrating the sensors 212 coupled to the steering pad piston-cylinder assembly 142 of the steering pad assembly 54. In the illustrated embodiment, the sensors 212 include a pressure sensor 230 and a plurality of position sensors 232 coupled to the steering pad piston-cylinder assembly 142 and the controller 200. As discussed in detail below, the pressure sensor 230 is configured to monitor a fluid pressure in the pressure chamber 246 over time, while the position sensors 232 are configured to monitor an actuation of the steering pad piston-cylinder assembly 142 of the steering pad assembly 54 over time.

Each steering pad piston-cylinder assembly 142 of the steering pad assembly 54 includes a piston 240 disposed in a cylinder 242, a rod or connector 244 extending from the piston 240 to the steering pad 140, a pressure chamber 246 within the cylinder 242 adjacent the piston 240, and the vent passage 214 extending from the pressure chamber 246 to the outer surface 148 of the RSS tool 64. For each actuation cycle, the piston 240 moves in a radially reciprocating manner in the cylinder 242 by moving in a radially outward direction 248 from a retracted position to an extended position, and then moving in a radially inward direction 250 from the extended position to the retracted position. The steering pad 140 moves with the piston 240 during each actuation cycle, such that the steering pad 140 moves in the radially reciprocating manner relative to the outer surface 148 of the RSS tool 64 by moving in the radially outward direction 248 from a retracted position to an extended position relative to the outer surface 148, and then moving in the radially inward direction 250 from the extended position to the retracted position relative to the outer surface 148. In operation, the controller 200 controls the steering pad valve 144 to open and enable a flow of a fluid (e.g., drilling mud) through a pressurized mud line 104 to the pressure chamber 246, thereby driving the piston 240 in the radial outward direction 248 from the retracted position to the extended position while at least a portion of the fluid vents through vent passage 214. Subsequently, the controller 200 controls the steering pad valve 144 to close and disable the flow of the fluid (e.g., drilling mud) through the pressurized mud line 104 to the pressure chamber 246, thereby enabling retraction of the piston 240 in the radial inward direction 250 from the extended position to the retracted position while the fluid vents from the pressure chamber 246 through vent passage 214. The controller 200 is configured to repeatedly trigger actuation cycles of each steering pad piston-cylinder assembly 142 of the steering pad assembly 54 to steer the drilling system in a desired direction for directional drilling. Unfortunately, during operation and exposure to various geological formations, the vent passage 214 may be partially or completely plugged by materials (e.g., plugged condition), the piston 240 and/or the steering pad 140 may be partially blocked or stuck by debris (e.g., stuck condition), or any combination thereof.

In the illustrated embodiment, the controller 200 receives and analysis sensor feedback from the sensors 212 (e.g., pressure sensor 230 and position sensors 232) to determine a health condition, perform a root cause analysis to identify a cause of various problems (e.g., control condition, failure condition, leak condition, plugged condition or stuck condition), and perform corrective control actions to address any health conditions. For example, the pressure sensor 230 monitors the fluid pressure in the pressure chamber 246 over time, and specifically over each actuation cycle when the piston 240 moves in the radially outward direction 248 followed by the radially inward direction 250. By further example, the position sensors 232 monitor the position of the piston 240 in the cylinder 242 over time, and specifically over each actuation cycle when the piston 240 moves in the radially outward direction 248 followed by the radially inward direction 250. The sensors 212 (e.g., position sensors 232) also may function as an actuation meter to count a number of actuations of the piston 240 over time. As discussed above with reference to FIG. 4, the controller 200 may analyze the sensor feedback for irregular measurements (e.g., irregular pressure and/or piston position measurements), low pressure, and/or hydraulic lag during a cycle of the piston 240 coupled to a respective steering pad 140. Again, the corrective control actions may include stopping drilling and cleaning drilling equipment, rotating the drill string at a high rotational speed for a duration of time, changing fluid flow (e.g., increased flow rate, pulsing flow, changing to a flushing fluid, etc.) through the RSS tool 64 to help clean out any plugging, performing a corrective steering control to compensate for the plugged condition and/or the stuck condition, or any combination thereof.

Figure 6:
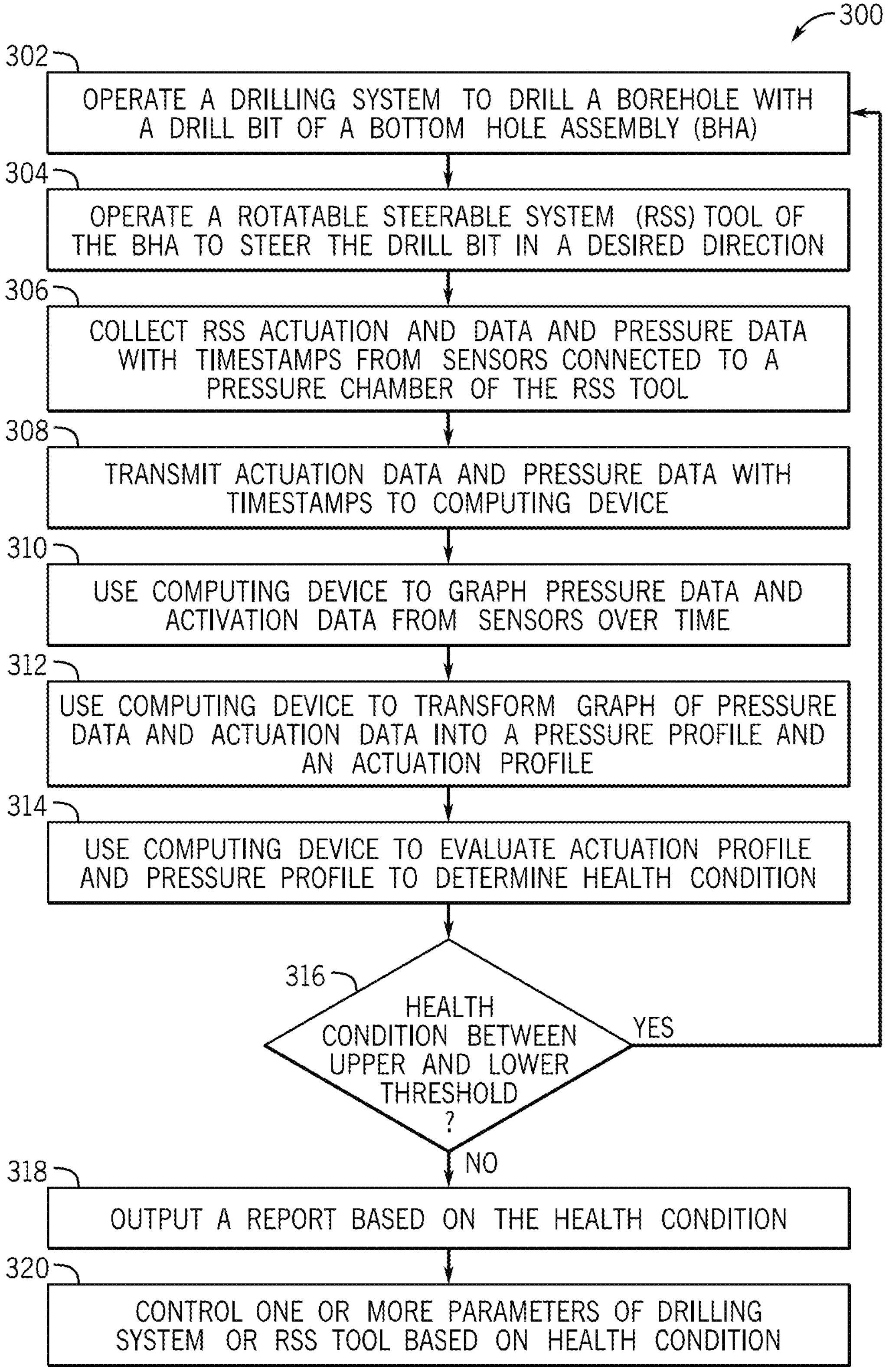
FIG. 6 is a flowchart of an embodiment of a method of monitoring wellbore conditions and quantifying RSS piston actuation quality using pressure data.

FIG. 6 is a flowchart of an embodiment of a process 300 of monitoring wellbore conditions and quantifying RSS piston actuation quality using pressure data. In standard operation, a depressurized piston 240 may be closed by opposing pistons 240 pushing against the hole being drilled (e.g., wellbore) and closes the depressurized piston 240. If the vent passage 214 is blocked, the drilling fluid 28 under the piston 240 may be trapped in the pressure chamber 246. As the piston 240 continues to close, the pressure in the pressure chamber 246 may increase because the drilling fluid 28 has no way to vent. The trapped drilling fluid 28 may also slow down actuation of the piston 240, because the piston 240 is fighting against the pressure in the pressure chamber 246 to close. Similarly, the piston 240 and/or the steering pad 140 may be partially or completely stuck due to various debris, and thus the piston 240 and steering pad 140 may have difficulty moving during an actuation cycle. The process 300 uses sensor feedback to identify such problems and perform corrective control actions to help ensure proper operation of the RSS tool 64.

At block 302 of the process 300, the system operates a drilling system 10 to drill a borehole 26 with a drill bit 20 of a bottom hole assembly (BHA) 34. For example, the process 300 may supply a drilling mud to the BHA 34, rotate the drill bit 20, and drill the borehole 26. The process 300 may control various operating parameters of the drilling system 10, including the BHA 34, based on sensor feedback in the borehole 26.

At block 302 of the process 300, the system may operate an RSS tool 64 of the BHA 34 to steer the drill bit 20 in a desired direction. As described above, the RSS tool 64 may include a steering pad piston-cylinder assembly 142, which may help direct drilling of the borehole 26 in a target direction toward a geological formation (e.g., oil and gas reservoir). Accordingly, the process 300 may cycle the steering pad valves 144 between open and closed positions to perform actuation cycles of each piston 240 in its respective cylinder 242 coupled to the respective steering pad 140, thereby steering the drilling system 10 in a desired direction. The fluid pressure in each pressure chamber 246 is controlled by the position of the steering pad valve 144, the proper venting of pressure chamber 246 by the vent passage 214, and the proper movement of the piston 240 and the steering pad 140.

Next, at block 306 of the process 300, the system may collect RSS tool 64 actuation data and pressure data with timestamps from sensors 212 connected to the pressure chamber 246 of the RSS tool 64. As discussed above, in some embodiments, the pressure sensor 230 and actuation meter (e.g., position sensors 232) may be located inside and/or directly along the pressure chamber 246. This may be beneficial to acquire very accurate actuation and pressure measurements. In some embodiments, it may be beneficial for the pressure sensor 230 and actuation meter (e.g., position sensors 232) to be outside but coupled to the pressure chamber 246. This may be advantageous to prevent the sensors 212 (e.g., 230, 232) from potentially interfering with or being damaged by the pistons. In yet other embodiments, the pressure sensor 230 may be located in the pressure chamber 246, while the actuation meter (e.g., position sensors 232) may be located outside the pressure chamber 246. As discussed above, the pressure sensor 230 monitors the fluid pressure over time for each pressure chamber 246, as the piston 240 moves in the actuation cycle first in the radially outward direction 248 followed by the radially inward direction 250. Similarly, the actuation meter (e.g., position sensors 232) monitors the piston actuation over time for each pressure chamber 246, as the piston 240 moves in the actuation cycle first in the radially outward direction 248 followed by the radially inward direction 250.

At block 308 of the process 300, the system may transmit the actuation data and pressure data with timestamps to a computing device. The actuation data and pressure data may be transmitted to the computing device continuously in real-time, at time intervals after acquiring the data for a period of time, or any combination thereof. The computing device may be a local computing device (e.g., downhole location at the RSS tool 64) or a remote computing device (e.g., a surface location). The system may transmit the actuation data and pressure data via wired communication lines and/or wireless communication. In certain embodiments, the computing device includes the controller 200 of the RSS tool 64.

The time period the system may record the pressure data and actuation data may be greater than 0.0001 second, greater than 0.001 seconds, greater than 0.02 seconds, or greater than 0.01 seconds. Operation conditions may be greater than 3 actuations/second, greater than 4 actuations/second, greater than 5 actuations/second, or greater than 6 actuations/second. Preferable measurement records may feature 50 to 100 measurement points for each actuation. The system may record the pressure data and actuation data with time stamps constantly, but the time period at which the system may analyze the pressure data and actuation data may depend on the goals of the user and speed of the drilling system 10. For instance, if the drilling system 10 is moving slowly, and the steering pad piston cylinder assembly 142 is, as a result, also moving slowly, the time period over which the system may batch the pressure data and actuation data may be longer than if the system is moving rapidly because the system is not experiencing as many actuations and pressure shifts. However, in certain embodiments, the controller 200 of the RSS tool 64 may continuously receive and analyze the pressure data and actuation data in real-time.

At block 310 of the process 300, the system may use the computing device to graph pressure data and actuation data from the sensors over time. In certain embodiments, the sensors may include the pressure sensors 230 measuring fluid pressure in the pressure chamber 246 and the position sensors 232 measuring the position of the piston 240 in the cylinder 242. In some embodiments, the sensors may further include sensors configured to measure a rotational speed of the RSS tool 64, sensors configured to measure a rate of penetration (ROP) of the drill bit 20 to deepen the borehole 26 into the geological formation, sensors configured to measure a weight on bit (WOB) of a force driving the drill bit 20, sensors configured to measure a dog leg severity (DLS) regarding changes in a curvature of the borehole 26, or any combination thereof. Each of the foregoing measurements may be graphed together and/or separately over time on an electronic display of a computing device.

At block 312 of the process 300, the system may use the computing device to transform the graph of pressure data and actuation data from sensors over time into a pressure profile and an actuation profile for an individual actuation cycle. In particular, the pressure profile indicates the pressure changes over time for the individual actuation cycle, whereas the actuation profile indicates the position of the piston 240 in the cylinder 242 over time for the individual actuation cycle. Each individual actuation cycle includes movement of the piston 240 in the radially outward direction 248 from the retracted position to the extended position (e.g., pressurization stroke or portion of the actuation cycle), followed by movement of the piston 240 in the radially inward direction 250 from the extended position to the retracted position (e.g., depressurization stroke or portion of the actuation cycle). In certain embodiments, the pressure profile and the actuation profile may include both the pressurization stroke and the depressurization stroke of the actuation cycle. However, in some embodiments, the pressure profile and the actuation profile may include only the pressurization stroke or only the depressurization stroke of the actuation cycle. In the embodiments discussed herein, the pressure profile and the actuation profile include at least the depressurization stroke of the actuation cycle to enable a health evaluation of the vent passage 214 and retraction of the piston 240. Thus, the pressure profile and the actuation profile provide a visual indication of a health of the RSS tool 64, particularly proper venting through the vent passage 214 and proper movement of the piston 240 and the steering pad 140. The pressure profile and the actuation profile may be output on an electronic display of a computing device for user analysis. Additionally, the pressure profile and the actuation profile may be further analyzed to determine a health condition of the RSS tool 64, identify a cause of any issues via a root cause analysis, or any combination thereof. These pressure and actuation profiles will be discussed further in the description of FIGS. 7-11.

Next, at block 314 of the process 300, the system may use a computing device to evaluate the actuation profile and the pressure profile to determine a health condition of the RSS tool 64. In certain embodiments, the process 300 may compare the pressure profile against a baseline pressure profile and/or compare the actuation profile against a baseline actuation profile, and determine the health condition of the RSS tool 64 depending on how closely the profiles (e.g., pressure profile and/or actuation profile) match the baseline profiles (e.g., baseline pressure profile and/or baseline actuation profile). In certain embodiments, the process 300 may rely only on the comparison of the pressure profile against the baseline pressure profile. Additionally, in certain embodiments, the comparison may be used to calculate a health evaluation factor, such as a correlation coefficient. However, any suitable health evaluation factors may be used based on the comparisons noted above.

In certain embodiments, the correlation coefficient is used as an indication of the health condition. For example, the correlation coefficient may be a value ranging from 0 to 1, and which indicates a degree of correlation between the pressure profile and the baseline pressure profile. In certain embodiments, the baseline pressure profile may be a worst case scenario, such as a plugged condition of the vent passage 214. However, in other embodiments, the baseline pressure profile may be an ideal pressure profile based on a computer model of operation of the RSS tool 64 or some other comparative pressure profile for evaluation purposes. Thus, the correlation coefficient of 1 indicates a best correlation with the baseline pressure profile, whereas the correlation coefficient of 0 indicates the worst correlation with the baseline profile. However, a variety of other value ranges health evaluation factors may be used withing the scope of the present embodiments. In certain embodiments, a similar correlation coefficient may be calculated based on a degree of correlation between the actuation profile and the baseline actuation profile.

In the illustrated embodiment of FIGS. 7-11 as discussed in further detail below, a correlation coefficient of 0.5 indicates an ideal correlation based on a computer model of operation of the RSS tool 64, whereas a correlation coefficient of 1 indicates a plugged condition (e.g., vent passage 214 not venting) and a correlation coefficient of 0 indicates a stuck condition (e.g., piston 240 not closing). Thus, the health condition of the RSS tool 64 gradually moves toward the plugged condition as the correlation coefficient increases above 0.5 toward 1, and the health condition of the RSS tool 64 gradually moves toward the stuck condition as the correlation coefficient decreases below 0.5 toward 0.

In certain embodiments, the process 300 may compare the actuation profile against a plurality of actuation profiles and/or compare the pressure profile against a plurality of pressure profiles. The comparisons may be used to identify a matching or closely matching combination of the actuation and pressure profiles with stored combinations of actuation and pressure profiles based on historical measurements, computer models or simulations, or a combination thereof. In certain embodiments, the process 300 may use artificial intelligence with machine learning to help identify a best match of the actuation and pressure profiles with the stored combinations of actuation and pressure profiles. Each of the stored combinations of actuation and pressure profiles may be associated with a particular value of the correlation coefficient, and thus the correlation coefficient may be acquired by identifying the best match. In certain embodiments, the process 300 may use artificial intelligence with machine learning to determine the correlation coefficient without identifying the best match, but rather by identifying multiple close matches and taking an average of the correlation coefficient for the close matches. However, the process 300 may analyze the actuation and pressure profiles using a variety of analysis techniques, computer models, historical data, artificial intelligence/machine learning, or any combination thereof, to determine the correlation coefficient. As appreciated, the correlation coefficient is a measure of the health condition of the RSS tool 64, particularly operation of the steering pad piston-cylinder assemblies 142 and the vent passage 214. Thus, depending on the correlation coefficient, the process 300 can determine if the vent passage 214 is plugged or clear and if the piston 240 is stuck or properly moving during an actuation cycle.

Once the health condition (e.g., correlation coefficient) is determined at block 314, at block 316 of process 300, the system may determine if the health condition (e.g., correlation coefficient) is between an upper and lower threshold. For example, the preferred correlation coefficient may be 0.5. However, the correlation coefficient may range between 0 and 1. The closer the correlation coefficient is to 0.5, the more healthy the RSS tool 64 is functioning (e.g., best health condition). In some embodiments, the upper and lower threshold of the correlation coefficient may be determined by the computing device, a user, artificial intelligence/machine learning, computer models, historical data, or any combination thereof. For example, the upper and lower thresholds may be 0.35 to 0.65, 0.4 to 0.6, 0.45 to 0.55, or any combination thereof. In some embodiments, the process 300 may include a plurality of different sets of upper and lower thresholds, each used to trigger different reports and/or corrective control actions.

If the system determines the health condition (e.g., correlation coefficient) is between an upper and lower threshold, the system may repeat the steps of the process 300 beginning at block 302. A health condition (e.g., correlation coefficient) between an upper and lower threshold may indicate the system is running healthy (e.g., best health or acceptable health condition). As such, the system has nothing to report on, nor would an adjustment in the parameters benefit the system if the system is running healthy.

If the system determines the health condition (e.g., correlation coefficient) is outside an upper and lower threshold at block 316 of the process 300, the system may move to block 318. At block 318 of the process 300, the system may output a report based on the health condition (e.g., correlation coefficient). In some embodiments, the report may be a notification displayed on a graphical user interface (GUI) on an electronic display of a computer device. The notification may include information about the drilling performance, such as the health condition (e.g., correlation coefficient), the pressure data, the pressure profile, the actuation data, the actuation profile, the downhole position data, the WOB, the ROP, and the DLS. In some embodiments, the report may also include potential errors occurring in the system, such as hole cleaning issues and other abnormal downhole conditions. In still other embodiments, the report may also include a list of recommendations the user may follow to solve the drilling errors and increase drilling efficiency. In embodiments where the system automatically controls the parameters of drilling based on the health condition (e.g., correlation coefficient), the report may notify the user of the parameter adjustments the system made. Further, the report may include a link for the user to override the system's parameter and adjustments. The override option may provide a way for the user to revert the parameters back to the original drilling parameters, or provide the option for the user to enter new or different parameters. The override link may require two-factor authentication, such as biometrics, a pin, facial recognition, a password, and the like to override the system's parameter adjustments.

At block 320 of the process 300, the system may control one or more parameters of the drilling system 10 or RSS tool 64 based on the health condition (e.g., correlation coefficient). The system may adjust the ROP, the WOB, the rotations per minute (RPM), the infeed rate, the chip load, the depth into the back-up board, the bottomhole temperature, the flow rate of drilling fluid 28, the feed pressure of drilling fluid 28, the water/flush pressure, the percussive pressure, and the like. The severity of the adjustment(s) may depend on how much the health condition (e.g., correlation coefficient) strays from the upper or lower threshold. For example, if the correlation coefficient is 0.9, the parameter adjustment may be much larger than if the correlation coefficient is 0.65. Further, the system may learn more about how adjusting different parameters affects the health condition (e.g., correlation coefficient) with artificial intelligence/machine learning. In situations where the system adjusts the parameters in a way that results in a health condition (e.g., correlation coefficient) that is outside the upper and lower thresholds, the system may readjust the parameters until the health condition (e.g., correlation coefficient) is within the upper and lower thresholds again. This process may be advantageous to entirely autonomous directional drilling.

In some embodiments, the system may automatically adjust the parameters of the drilling system 10 based on the health condition (e.g., correlation coefficient). The system may utilize the health condition (e.g., correlation coefficient) to determine which parameters to adjust and how much to adjust those parameters. The system may adjust the parameters without the user's input. For example, if a plugged condition and/or a stuck condition is detected by the process 300, then a control system (e.g., controller 200) may initiate one or more corrective actions in real-time based on the sensor feedback as discussed in detail above. For example, the corrective control actions may include stopping drilling and cleaning drilling equipment, rotating the drill string at a high rotational speed for a duration of time, changing fluid flow (e.g., increased flow rate, pulsing flow, changing to a flushing fluid, etc.) through the RSS tool 64 to help clean out any plugging, performing a corrective steering control to compensate for the plugged condition and/or the stuck condition, or any combination thereof. The corrective control actions may further include actions to address a control condition, a failure condition, and/or a leak condition.

In some embodiments, the system may suggest parameter adjustments to the user via a report and may only adjust the parameters once the user approves of the adjustments. The system may send the user a report explaining suggested parameter adjustments. The user may review these adjustments and approve or disapprove of the adjustments. If the user approves the adjustments, the system may implement the parameter adjustments. The system may also indicate which parameters should only be adjusted together, rather than individually. For example, it may be advantageous to adjust the ROP and flow rate of drilling fluid together, but it may be inconsequential to only adjust one of the two. As such, in some embodiments, the user may only accept or reject parameters which may be adjusted together. If the user disapproves of a parameter adjustment, the system may provide the user with one or more alternative options, or may provide a method for the user to input their own.

In some embodiments, the system may adjust the parameters based on the user's input. The system may provide the user with information about the correlation coefficient, the pressure data, the pressure profile, the actuation data, the actuation profile, and the like. The user may then enter different parameter adjustments for the system to make. The system may warn the user if the system detects a potential error with the user's parameter adjustments that may negatively impact the drilling system 10 or its efficiency.

Figure 7:
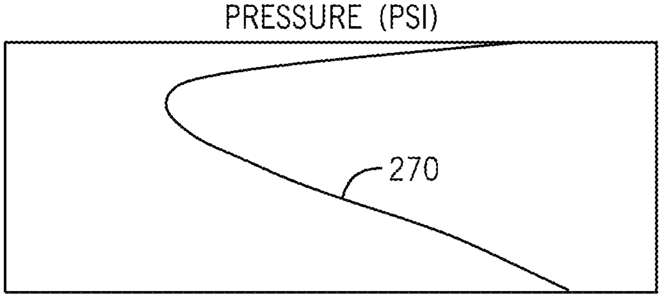
FIG. 7 illustrates an embodiment of a pressure profile during one cycle of operation of the RSS, wherein a correlation coefficient is 1 indicating a case of nozzle plugging and other abnormal downhole conditions.

FIG. 7 illustrates an embodiment of a pressure profile 270 during one cycle of operation of the RSS tool 64, where the correlation coefficient is 1. As illustrated in FIG. 7, the pressure profile 270 experiences an initial decrease in pressure followed by a rapid increase in pressure. The rapid increase in pressure occurs during a retraction of the piston 240, indicating that the vent passage 214 is in a plugged condition and will not allow proper venting of the pressure chamber 246 as the piston 240 is biased inwardly toward the retracted position. This pressure profile 270 is indicative of extreme nozzle plugging and other abnormal downhole conditions. Further, it indicates little DLS performance. In certain embodiments, the pressure profile 270 of FIG. 7 is used as the baseline pressure profile for a determination of the health condition (e.g., correlation coefficient). As illustrated, the pressure profile 270 includes at least the depressurization stroke of the cycle, and thus shows a depressurization curve. However, in certain embodiments, the pressure profile 270 includes the pressurization stroke (e.g., pressurization curve) and the depressurization stroke (e.g., depressurization curve) of the cycle.

Figure 8:
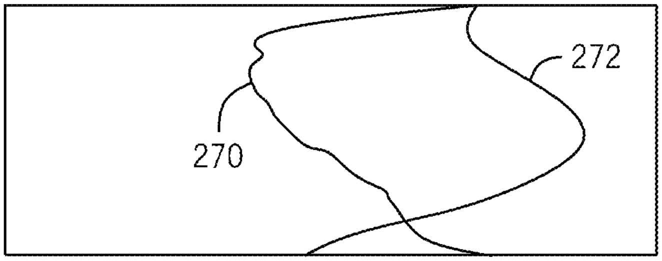
FIG. 8 illustrates an embodiment of a pressure profile during one cycle of operation of the RSS, wherein the correlation coefficient is greater than 0.95, but less than 1, indicating nozzle plugging of lesser severity than illustrated in FIG. 7.

FIG. 8 illustrates an embodiment of a pressure profile 270 during one cycle of operation of the RSS tool 64, where the correlation coefficient is greater than 0.95, but less than 1. In the illustrated embodiment, the pressure profile 270 curves downward and then upward, whereas the actuation profile 272 curves upward and then downward. Similar to FIG. 7, the pressure profile 270 indicates a relatively rapid increase in pressure during a retraction of the piston 240, thereby indicating at least some degree of plugging of the vent passage 214 (e.g., partially plugged condition). This scenario is suboptimal, and indicates parameters may need to be adjusted for the system to operate efficiently.

Figure 9:
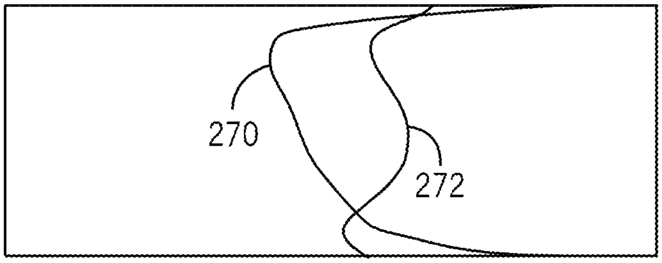
FIG. 9 illustrates an embodiment of a pressure profile during one cycle of operation of the RSS, wherein the correlation coefficient is approximately 0.75, indicating nozzle plugging of lesser severity than illustrated in FIGS. 7 and 8.

FIG. 9 illustrates an embodiment of a pressure profile 270 during one cycle of operation of the RSS tool 64, where the correlation coefficient is approximately 0.75. In the illustrated embodiment, the pressure profile 270 curves downward and then upward, whereas the actuation profile 272 curves downward, upward, downward, and upward. Similar to FIGS. 7 and 8, the pressure profile 270 indicates an increase in pressure during a retraction of the piston 240, thereby indicating at least some degree of plugging of the vent passage 214 (e.g., partially plugged condition). Regardless, this scenario is suboptimal, and indicates parameters may need to be adjusted for the system to operate efficiently. However, the parameters may not require as severe of an adjustment as the scenarios of FIGS. 7 and 8.

Figure 10:
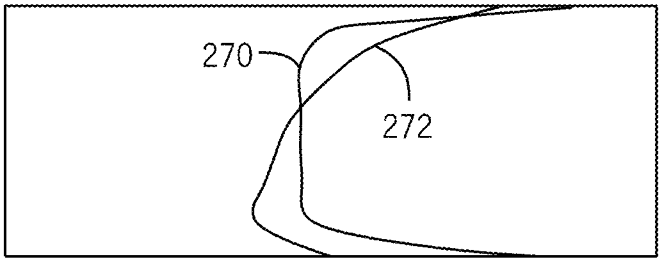
FIG. 10 illustrates an embodiment of a pressure profile during one cycle of operation of the RSS, wherein the correlation coefficient is approximately 0.5, indicating a generally ideal operation of the RSS according to a hydraulic model.

FIG. 10 illustrates an embodiment of a pressure profile 270 during one cycle of operation of the RSS tool 64, where the correlation coefficient is approximately 0.5. In the illustrated embodiment, the pressure profile 270 curves rapidly downward, remains substantially constant, and then curves rapidly upward, whereas the actuation profile 272 curves gradually downward and then upward. This pressure profile 270 is the optimal scenario, with a pressure profile 270 substantially matching an ideal pressure profile based on a hydraulic computer model or simulation. This pressure profile 270 has optimized actuations for DLS.

Figure 11:
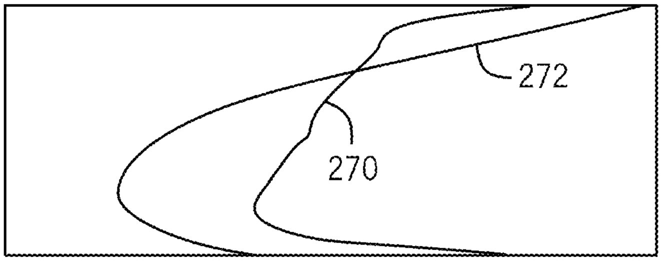
FIG. 11 illustrates an embodiment of a pressure profile during one cycle of operation of the RSS, wherein the correlation coefficient is approximately 0, indicating a failure of a piston to properly close in the fluid actuator (e.g., piston-cylinder assembly).

FIG. 11 illustrates an embodiment of a pressure profile 270 during one cycle of operation of the RSS tool 64, where the correlation coefficient is approximately 0. In the illustrated embodiment, the pressure profile 270 curves rapidly downward and then rapidly upward, whereas the actuation profile 272 curves gradually downward and then upward. This scenario may indicate the piston 240 is not properly moving from the extended position to the retracted position, and thus the piston 240 and/or the steering pad 140 may be at least partially or completely stuck (e.g., stuck condition). Consequently, opposing pistons 240 and associated steering pads 140 may not actuate fully as well. The stuck condition may be due to debris, other abnormal downhole conditions, and/or eccentricity in the borehole 26 that blocks movement of the pistons 240 and associated steering pads 140 in the borehole 26. In some situations, the borehole 26 may be over gauged, so the pistons 240 may not be able to close. As a result, this scenario may indicate a lower DLS performance.

Technical effects of the disclosed embodiments enable pressure and piston actuation monitoring of the RSS tool 64 to evaluate a health condition (e.g., control condition, failure condition, leak condition, plugged condition, stuck condition, etc.) of the RSS tool 64, particularly operation of the steering pad piston-cylinder assembly 142 and the vent passage 214. For example, the pressure measurements help to identify issues with venting of the vent passage 214 and movements of the piston 240, and thus movements of the steering pad 140. Additionally, the identified health condition may enable a controller 200 to perform one or more corrective control actions to reduce or eliminate the health condition. The monitoring and corrective control actions may be performed in real-time during drilling operations, thereby enabling real-time adjustments to the directional drilling. The monitoring and corrective control actions may help to avoid improper steering by the RSS tool 64, thereby helping to avoid missing a target location of resources in a geological formation.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:

a rotatable steerable system (RSS) of a drilling system, wherein the RSS comprises:
- a first steering pad;
- a first fluid actuator coupled to the first steering pad;
- a first vent passage coupled to the first fluid actuator;
- a first valve coupled to the first fluid actuator; and
- a first pressure sensor coupled to the first fluid actuator; and a controller configured to i) analyze pressure measured by the first pressure sensor to determine a first pressure profile during an actuation cycle of the first fluid actuator, wherein the first pressure profile comprises a first depressurized pressure curve for the actuation cycle, and the first depressurized pressure curve corresponds to the pressure of the first fluid actuator after closure of the first valve, and ii) determine a health condition of the RSS based on the first pressure profile.

2. The system of claim 1, wherein:

the controller has a processor, a memory, and instructions stored on the memory and executable by the processor to analyze the pressure measured by the first pressure sensor and determine the health condition of the RSS.

3. The system of claim 1, wherein:

the health condition of the RSS is based on a correlation factor between the first pressure profile and a baseline profile.

4. The system of claim 1, wherein:

the controller is further configured to perform at least one control action in response to the health condition of the RSS.

5. The system of claim 4, wherein:
the at least one control action comprises a stop of drilling by the drilling system, a cleaning operation to clean the RSS, a change in a rotational speed of a drill string of the drilling system, a change in a fluid flow through the RSS, or a combination thereof.

6. The system of claim 1, wherein:
the RSS further comprises a first actuation sensor coupled to the first fluid actuator to measure position of the first fluid actuator; and
the controller is further configured to analyze position of the first fluid actuator measured by the first actuation sensor to determine an actuation profile during the actuation cycle of the first fluid actuator and determine the health condition of the RSS based on the actuation profile.

7. The system of claim 1, wherein:
the health condition comprises a plugged condition or a stuck condition of the RSS.

8. The system of claim 1, wherein:
the first fluid actuator comprises a first piston disposed in a first cylinder, the first vent passage is coupled to a first pressure chamber of the first cylinder, and the first piston is coupled to the first steering pad.

9. The system of claim 1, wherein;
the RSS further comprises:
a second steering pad;
a second fluid actuator coupled to the second steering pad;
a second vent passage coupled to the second fluid actuator;
a second valve coupled to the second fluid actuator; and
a second pressure sensor coupled to the second fluid actuator; and
wherein the controller is further configured to i) analyze pressure measured by the second pressure sensor to determine a second pressure profile during an actuation cycle of the second fluid actuator, wherein the second pressure profile comprises a second depressurized pressure curve for the actuation cycle, and the second depressurized pressure curve corresponds to the pressure of the second fluid actuator after closure of the second valve, and ii) determine a health condition of the RSS based on the second pressure profile.

10. The system of claim 9, wherein:
the RSS further comprises:
a third steering pad;
a third fluid actuator coupled to the third steering pad;
a third vent passage coupled to the third fluid actuator;
a third valve coupled to the third fluid actuator; and
a third pressure sensor coupled to the third fluid actuator; and
wherein the controller is further configured to i) analyze pressure measured by the third pressure sensor to determine a third pressure profile during an actuation cycle of the third fluid actuator, wherein the third pressure profile comprises a third depressurized pressure curve for the actuation cycle, and the third depressurized pressure curve corresponds to the pressure of the third fluid actuator after closure of the third valve, and ii) determine a health condition of the RSS based on the third pressure profile.

11. The system of claim 1, wherein:
the first fluid actuator comprises a piston; and
the first depressurized pressure curve characterizes retraction of the piston and venting through the first vent passage.

12. A method, comprising:
operating a rotatable steerable system (RSS) of a drilling system, wherein the RSS comprise:
a first steering pad;
a first fluid actuator coupled to the first steering pad;
a first vent passage coupled to the first fluid actuator;
a first valve coupled to the first fluid actuator; and
a first pressure sensor coupled to the first fluid actuator; and
configuring a controller to i) analyze pressure measured by the first pressure sensor to determine a pressure profile during an actuation cycle of the first fluid actuator, wherein the pressure profile comprises a depressurized pressure curve for the actuation cycle, and the depressurized pressure curve corresponds to the pressure of the first fluid actuator after closure of the first valve, and ii) determine a health condition of the RSS based on the pressure profile monitoring.

13. The method of claim 12, wherein:
the health condition of the RSS is based on a correlation factor between the pressure profile and a baseline profile.

14. The method of claim 12, further comprising:
performing at least one control action in response to the health condition of the RSS, wherein the at least one control action comprises a stop of drilling by the drilling system, a cleaning operation to clean the RSS, a change in a rotational speed of a drill string of the drilling system, a change in a fluid flow through the RSS, or a combination thereof.

15. The method of claim 12, wherein:
the first fluid actuator comprises a piston; and
the depressurized pressure curve characterizes retraction of the piston and venting through the first vent passage.

16. A system, comprising:
a controller configured to:
operate a rotatable steerable system (RSS) of a drilling system, wherein the RSS comprises:
a first steering pad;
a first fluid actuator coupled to the first steering pad;
a first vent passage coupled to the first fluid actuator;
a first valve coupled to the first fluid actuator; and
a first pressure sensor coupled to the first fluid actuator;
analyze pressure measured by the first pressure sensor to determine a pressure profile during an actuation cycle of the first fluid actuator, wherein the pressure profile comprises a depressurized pressure curve for the actuation cycle, and the depressurized pressure curve corresponds to the pressure of the first fluid actuator after closure of the first valve;
determine a health condition of the RSS based on the pressure profile; and
perform at least one control action in response to the health condition of the RSS.

17. The system of claim 16, wherein:
the at least one control action comprises a stop of drilling by the drilling system, a cleaning operation to clean the RSS, a change in a rotational speed of a drill string of the drilling system, a change in a fluid flow through the RSS, or a combination thereof.

18. The system of claim 16, wherein;
the health condition of the RSS is based on a correlation factor between the pressure profile and a baseline profile.

19. The system of claim 16, wherein:

the controller has a processor, a memory, and instructions stored on the memory and executable by the processor to analyze the pressure measured by the first pressure sensor and determine the health condition of the RSS.

20. The system of claim 16, wherein:

the first fluid actuator comprises a piston; and the depressurized pressure curve characterizes retraction of the piston and venting through the first vent passage.

* * * * *